US012763890B2

(12) United States Patent
Kanneath Abraham et al.

(10) Patent No.: US 12,763,890 B2
(45) Date of Patent: Oct. 13, 2026

(54) METHOD AND APPARATUS FOR CONFIGURING MUSIM GAPS IN DUAL CONNECTIVITY IN A COMMUNICATION SYSTEM

(71) Applicant: SAMSUNG ELECTRONICS CO., LTD., Suwon-si (KR)

(72) Inventors: Aby Kanneath Abraham, Bangalore (IN); Vinay Kumar Shrivastava, Bangalore (IN); Sriganesh Rajendran, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 18/440,685

(22) Filed: Feb. 13, 2024

(65) Prior Publication Data

US 2024/0275537 A1 Aug. 15, 2024

(30) Foreign Application Priority Data

Feb. 14, 2023 (IN) ............................ 202341009766
Jan. 30, 2024 (IN) ............................ 202341009766

(51) Int. Cl.
*H04W 72/563* (2023.01)
*H04L 5/00* (2006.01)
(Continued)

(52) U.S. Cl.
CPC ......... *H04L 5/0035* (2013.01); *H04W 72/231* (2023.01); *H04W 72/563* (2023.01); *H04W 88/06* (2013.01)

(58) Field of Classification Search
CPC ........... H04W 36/0088; H04W 60/005; H04W 72/231; H04W 72/563; H04W 76/15; H04W 8/183; H04W 88/06; H04L 5/0035
(Continued)

(56) References Cited

U.S. PATENT DOCUMENTS

2023/0048297 A1* 2/2023 Lee ....................... H04W 24/08
2023/0224890 A1* 7/2023 Cha ....................... H04W 76/28 370/329
(Continued)

FOREIGN PATENT DOCUMENTS

| | | | |
|---|---|---|---|
| EP | 4132201 | A1 | 2/2023 |
| EP | 4322701 | A1 | 2/2024 |
| WO | 2022235120 | A1 | 11/2022 |

OTHER PUBLICATIONS

International Search Report and Written Opinion of the International Searching Authority dated May 9, 2024, in connection with International Application No. PCT/KR2024/001948, 7 pages.
(Continued)

*Primary Examiner* — Joseph Arevalo

(57) ABSTRACT

The disclosure relates to a 5G or 6G communication system for supporting a higher data transmission rate. Embodiments of the disclosure describe a method and a system for configuring multi universal subscriber identity module (MUSIM) gaps for multi-subscriber identity module user equipment (UE) in a communication network. The method comprises receiving (402), at a master node associated with a network entity from the multi-SIM UE, a gap configuration request. Further, the method comprises configuring, by the master node, the multi-SIM UE with MUSIM gaps based on the received gap configuration request. Further, the method comprises sending, by the master node to a secondary node associated with the network entity, a message indicative of the MUSIM gaps configured for the multi-SIM UE, wherein the message includes information related to gap priority of the MUSIM gaps.

16 Claims, 4 Drawing Sheets

(51) Int. Cl.
*H04W 72/231* (2023.01)
*H04W 88/06* (2009.01)

(58) Field of Classification Search
USPC ....... 370/329, 315, 331, 328, 242, 336, 252, 370/230.1, 311, 340, 230
See application file for complete search history.

(56) References Cited

U.S. PATENT DOCUMENTS

| | | | | |
|---|---|---|---|---|
| 2024/0357443 | A1* | 10/2024 | Park | H04W 36/249 |
| 2025/0056344 | A1* | 2/2025 | Park | H04W 76/27 |
| 2025/0106939 | A1* | 3/2025 | Wu | H04W 76/15 |

OTHER PUBLICATIONS

Qualcomm Incorporated, "[AT118-e][232][ MUSIM] Corrections to MUSIM gap configuration aspects", R2-2206171, 3GPP TSG-RAN WG2 Meeting #118-e, Electronic, May 2022, 32 pages.
Nokia et al., "Clarifications for MUSIM UAI handling", R2-2204618, 3GPP TSG-RAN WG2 Meeting #118 Electronic, May 2022, 17 pages.
Nokia et al., "Remaining open issues in MUSIM Gap configuration", R2-2202740, 3GPP TSG-RAN WG2 Meeting #117 Electronic, Online, Feb. 21-Mar. 3, 2022, 7 pages.
3GPP TS 38.133 V18.4.0 (Dec. 2023) Technical Specification; 3rd Generation Partnership Project; Technical Specification Group Radio Access Network; NR; Requirements for support of radio resource management (Release 18); 130 pages.
Samsung, "Further discussion on UE capabilities and MN-SN coordination," 3GPP TSG-RAN WG2 Meeting #124 R2-2313420, Chicago, USA Nov. 13-17, 2023, 2 pages.
3GPP TS 38.331 V18.0.0 (Dec. 2023) Technical Specification; 3rd Generation Partnership Project; Technical Specification Group Radio Access Network; NR; Radio Resource Control (RRC) protocol specification (Release 18); 1608 pages.
Office Action issued Apr. 7, 2026, in connection with Indian Patent Application No. 202341009766, 8 pages.

* cited by examiner

METHOD AND APPARATUS FOR CONFIGURING MUSIM GAPS IN DUAL CONNECTIVITY IN A COMMUNICATION SYSTEM

CROSS-REFERENCE TO RELATED APPLICATIONS

This application is based on and claims priority under 35 U.S.C. § 119 to Indian Patent Application No. 202341009766 filed on Feb. 14, 2023, and Indian Patent Application No. 202341009766 filed on Jan. 30, 2024, in the Indian Intellectual Property Office, the disclosures of which are incorporated by reference herein in their entirety.

BACKGROUND

1. Field

The present disclosure generally relates to wireless communication, and more particularly relates to a method and a system for configuring multi universal subscriber identity module (MUSIM) gaps for multi-SIM user equipment (UE) in dual connectivity.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

This summary is provided to introduce a selection of concepts, in a simplified format, that are further described in the detailed description of the disclosure. This summary is neither intended to identify key or essential inventive concepts of the disclosure nor is it intended for determining the scope of the disclosure.

According to one embodiment of the present disclosure, a method for configuring multi universal subscriber identity module (MUSIM) gaps for multi-subscriber identity module (SIM) user equipment (UE) in a communication network is disclosed. The method comprises receiving, from the multi-SIM UE at a master node associated with a network entity of the communication network, a gap configuration request. Further, the method comprises generating, by the master node, a configuration for the multi-SIM UE with MUSIM gaps based on the received gap configuration request. Further, the method comprises sending, by the master node to a secondary node associated with the network entity, a message indicative of the MUSIM gaps configured for the multi-SIM UE, wherein the message includes information related to gap priority of the MUSIM gaps.

According to one embodiment of the present disclosure, a system for configuring multi universal subscriber identity module (MUSIM) gaps for multi-subscriber identity module (SIM) user equipment (UE) in a communication network is disclosed. The system includes a master node and a secondary node. The system is configured to receive, at a master node associated with a network entity from the multi-SIM UE, a gap configuration request. Further, the system is configured to generate, by the master node, a configuration for the multi-SIM UE with MUSIM gaps based on the received gap configuration request. Further, the system is configured to send, by the master node to a secondary node associated with the network entity, a message indicative of the MUSIM gaps configured for the multi-SIM UE, wherein the message includes information related to gap priority of the MUSIM gaps.

To further clarify the advantages and features of the present disclosure, a more particular description of the disclosure will be rendered by reference to specific embodiments thereof, which are illustrated in the appended drawings. It is appreciated that these drawings depict only typical embodiments of the disclosure and are therefore not to be considered limiting of its scope. The disclosure will be described and explained with additional specificity and detail in the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

In one embodiment, a method is provided. The method is performed by a user equipment (UE) in a communication system, the method comprising: transmitting, to a first base station, a request message for at least one multi universal subscriber identity module (MUSIM) gap; receiving, from the first base station, a radio resource control (RRC) message including a configuration of the at least one MUSIM gap, the configuration including information associated with a MUSIM gap priority; and performing, a MUSIM gap configuration procedure based on the MUSIM gap priority, wherein the information associated with the MUSIM gap priority is transmitted from the first base station to a second base station.

In one embodiment, a method is provided. The method performed by a first base station in a communication system, the method comprising: receiving, from a user equipment (UE), a request message for at least one multi universal subscriber identity module (MUSIM) gap; and transmitting, to the UE, a radio resource control (RRC) message including a configuration of the at least one MUSIM gap, the configuration including information associated with a MUSIM gap priority, wherein a MUSIM gap configuration procedure based on the MUSIM gap priority is performed, and wherein the information associated with the MUSIM gap priority is transmitted to a second base station. In one embodiment, a UE is provided. The user equipment (UE) in a communication system, the UE comprising: a transceiver, and a controller coupled with the transceiver configured to: transmit, to a first base station, a request message for at least one multi universal subscriber identity module (MUSIM) gap; receive, from the first base station, a radio resource control (RRC) message including a configuration of the at least one MUSIM gap, the configuration including information associated with a MUSIM gap priority; and perform, a MUSIM gap configuration procedure based on the MUSIM gap priority, wherein the information associated with the MUSIM gap priority is transmitted from the first base station to a second base station.

In one embodiment, a first base station is provided. The first base station in a communication system, the first base station comprising: a transceiver, and a controller coupled with the transceiver configured to: receive, from a user equipment (UE), a request message for at least one multi universal subscriber identity module (MUSIM) gap; and transmit, to the UE, a radio resource control (RRC) message including a configuration of the at least one MUSIM gap, the configuration including information associated with a MUSIM gap priority, wherein a MUSIM gap configuration procedure based on the MUSIM gap priority is performed, and wherein the information associated with the MUSIM gap priority is transmitted to a second base station.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
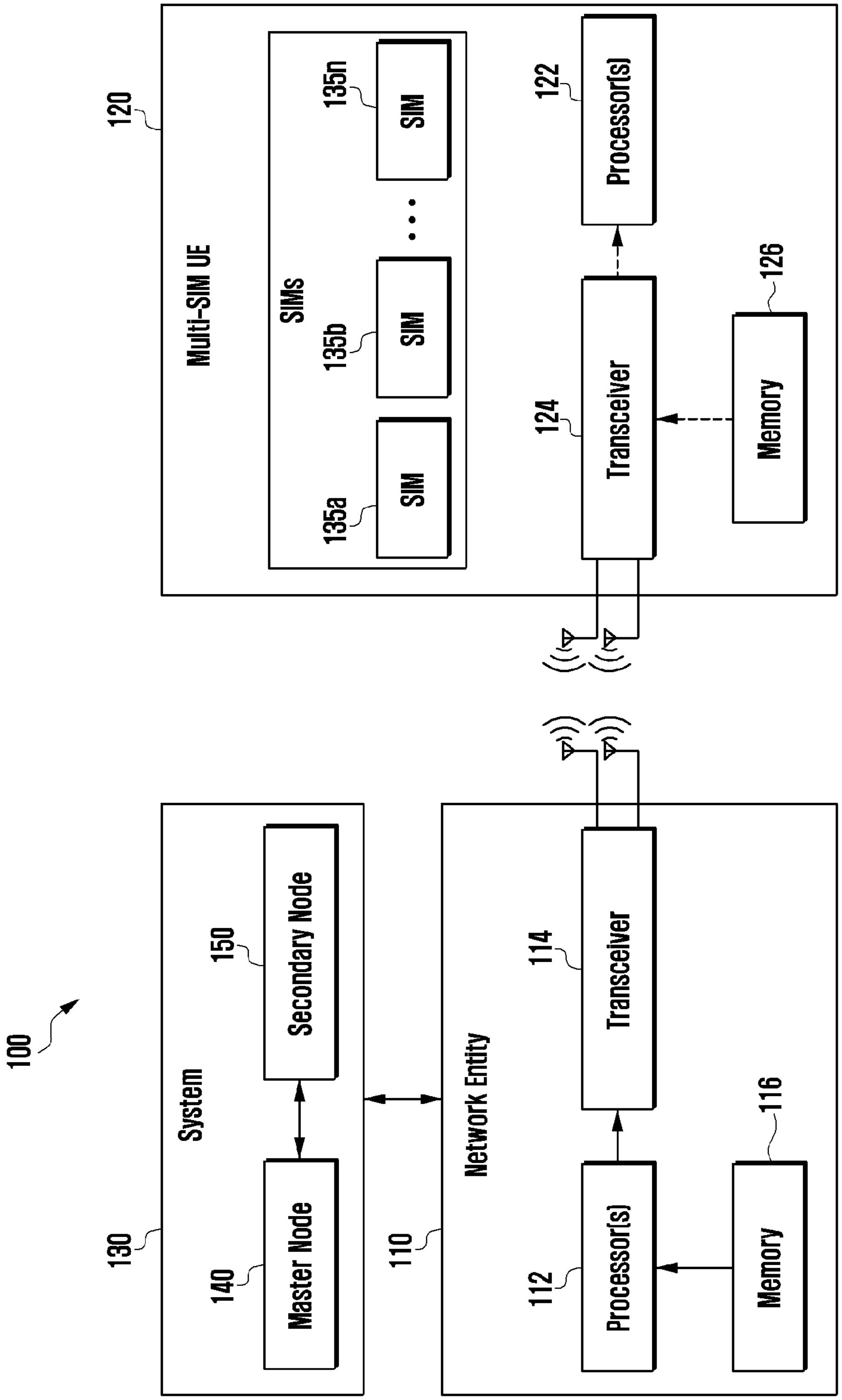
FIG. 1 illustrates an example of a communication environment associated with a communication network according to an embodiment as disclosed herein.

Further, skilled artisans will appreciate those elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

Multi-subscriber identity module (SIM) devices refer to devices that host more than one SIM which allows the multi-SIM device to connect to two or more different networks in order to avail different data plans, have user profiles like home and office, increased connectivity/reliability with multiple connections, etc. In order to save on the cost, radio frequency (RF) circuitry used by the UE is common for multiple SIMs. As a result, multiple SIMs need to arbitrate and share the common RF resources among themselves to perform the respective activities and/or avail the respective services. Effectively, only one SIM and its associated protocol stack can be served. Meanwhile, all other SIMs and their associated protocol stacks may be waiting for the RF resource to be available for them. One or more of the multiple SIMs can be engaged in paging reception, system information block (SIB) acquisition, measurement, data or voice call, multimedia broadcast multicast service (MBMS), emergency call, access stratum (AS) signaling, non-access stratum (NAS) signaling and so on.

MUSIM UEs were previously operating without network control by creating arbitrary gaps till the 3rd generation partnership project (3GPP) decided to introduce support for MUSIM device operations in Release 17. From Release 17, a connected universal-SIM (USIM) in a MUSIM device can notify the connected mode network on network switching for multi-SIM operations. The USIM in the context of the present disclosure may refer to radio protocol stack associated with the UE. There are two types of network switching supported by the network. In the first type, the connected USIM leaves the connected network and completely switches to the other USIM, i.e., another USIM becomes connected. In another type, connected USIM requests for the gap from its network for the MUSIM operations like listening for paging or performing measurements in the idle USIM.

Reference is made to 3GPP V17.3.0 of TS 38.331, TS 38.300, TS 37.340, and TS 38.423. In release 17, MUSIM UE uses radio resource control (RRC) UE assistance information (UAI) procedure to request gaps or to notify about leaving. The network (next generation Node B (gNB)) configures the UE whether the UE can provide assistance information for MUSIM gaps or MUSIM Leave using otherConfig in RRC messages. Musim-GapAssistanceConfig in otherConfig is used for informing UE whether the UE can provide MUSIM assistance information for providing gap information. In release 17, only per-UE gaps are supported for MUSIM operations.

Table-1 depicts an example of new radio (NR) RRC specification on how otherConfig including musim-GapAssistanceConfig is used.

TABLE 1

1> if the received otherConfig includes the musim-GapAssistanceConfig:
2> if musim-GapAssistanceConfig is set to setup:
3> consider itself to be configured to provide MUSIM assistance information without leaving RRC_CONNECTED in accordance with 3GPP standard specification;
2> else:
3> consider itself not to be configured to provide MUSIM assistance information without leaving RRC_CONNECTED in accordance with 3GPP standard specification and stop timer T3yy, if running;

Table-2 depicts an example of NR RRC specification on the definition of otherConfig including musim-GapAssistanceConfig.

TABLE 2

```
  RRCReconfiguration-v17xy-IEs: = SEQUENCE {
    otherConfig-v17xy          OtherConfig-v17xy            OPTIONAL, -- Need
M
    musim-GapConfig-r17                  SetupRelease {MUSIM-GapConfig-r17}
OPTIONAL, -- Need M
    nonCriticalExtension             SEQUENCE { }          OPTIONAL
  }
  OtherConfig-v17xy: =            SEQUENCE {
    musim-GapAssistanceConfig-r17                        SetupRelease {MUSIM-
GapAssistanceConfig-r17}    OPTIONAL, -- Need M
    musim-LeaveAssistanceConfig-r17                      SetupRelease {MUSIM-
LeaveAssistanceConfig-r17}    OPTIONAL -- Need M
  }
  MUSIM-GapAssistanceConfig-r17: =    SEQUENCE {
  musim-GapProhibitTimer-r17        ENUMERATED {s0, sodot1, s0dot2, s0dot3,
s0dot4, s0dot5, s1, s2, s3, s4, s5, s6, s7, s8, s9, s10}
  }
```

The musim-GapAssistanceConfig communicated by the network (gNB) to the UE in the NR specification (initial version of TS 38.331 specification) contains only musim-GapProhibitTimer that is the prohibit timer for MUSIM assistance information reporting without leaving RRC_CONNECTED for MUSIM purpose.

The configured MUSIM UE (connected USIM) requests for gaps for MUSIM purposes by sending UE Assistance Information as in the below example extracts from 3GPP TS 38.331 specification, as shown in Table-3 and Table-4 below. The MUSIM UE (connected USIM) requests for gaps for the operations of other USIM in the same device. The other USIM (i.e., other than connected USIM) may use the gaps for performing measurements, reading paging messages, reading system information and so on.

TABLE 3

A UE capable of providing MUSIM assistance information may initiate the procedure if the UE was configured to do so, upon determining that the UE needs to leave RRC_CONNECTED state, or upon determining the UE needs the gaps, or upon change of the gap information without leaving RRC_CONNECTED state.

1> if configured to provide MUSIM assistance information without leaving RRC_CONNECTED:

2> if the UE has a preference on the MUSIM gap(s) and the UE did not transmit a UEAssistanceInformation message with musim-GapPreferenceList since the UE was configured to provide MUSIM assistance information without leaving RRC_CONNECTED; or 2> if the current musim-GapPreferenceList is different from the one indicated in the last transmission of the UEAssistanceInformation message including musim-GapPreferenceList and the timer T3yy is not running:

3> initiate transmission of the UEAssistanceInformation message in accordance with 3GPP standard specification to provide the current musim-GapPreferenceList;

3> start the timer T3yy with the timer value set to the musim-GapProhibitTimer.

TABLE 4

1> if transmission of the UEAssistanceInformation message is initiated to provide MUSIM assistance information according to 3GPP standard specification :

2> if the UE has a preference for MUSIM periodic gap(s):

3> include musim-GapPreferenceList, with an entry for each periodic gap the UE prefers to be configured;

4> set musim-Gaplength and musim-GapRepetitionAndOffset in the musim-GapInfo IE to the values of the length and the repetition/offset of the gap(s), respectively, the UE prefers to be configured with;

2> if the UE has a preference for MUSIM aperiodic gap:

3> include the field musim-GapPreferenceList, with one entry for the aperiodic gap the UE prefers to be configured;

4> set musim-Gaplength and musim-Starting-SFN-AndSubframe in the musim-GapInfo IE to the values of respectively the length and the starting SFN/ subframe of the gap, respectively, the UE prefers to be configured with;

2> else (if the UE has no longer preference for the periodic/aperiodic gaps):

3>do not include musim-GapPreferenceList in the musim-Assistance IE;

The UE uses MUSIM assistance Information for both periodic and aperiodic gaps. For periodic gaps, assistance information includes gap repetition period and gap offset. For aperiodic gaps, which are one-time gaps, UE provides starting system frame number (SFN) and Subframe required for the gap.

Depicted in Table-5 and Table-6 are extracts includes the definition and description of MUSIM gap information requested by the connected UE to the connected network in the UE assistance information.

TABLE 5

```
MUSIM-Assistance-r17: =    SEQUENCE {
    musim-PreferredRRC-State-r17    ENUMERATED {IDLE, INACTIVE,
outOfConnected}    OPTIONAL,
    musim-GapPreferenceList-r17                MUSIM-GapPreferenceList-r17
OPTIONAL,
  ...
  }
  MUSIM-GapPreferenceList-r17    ::=    SEQUENCE (SIZE (1..3)) OF MUSIM-
GapInfo-r17
  MUSIM-GapInfo-r17: =    SEQUENCE {
    musim-Starting-SFN-AndSubframe-r17    MUSIM-Starting-SFN-AndSubframe-
r17    OPTIONAL,
    musim-GapLength-r17        ENUMERATED {ms43, ms4, ms6, ms10, ms20},
  musim-GapRepetitionAndOffset-r17    CHOICE {
    ms20-r17            INTEGER (0..19),
    ms40-r17            INTEGER (0..39),
    ms80-r17            INTEGER (0..79),
    ms160-r17             INTEGER (0..159),
    ms320-r17             INTEGER (0..319),
    ms640-r17             INTEGER (0..639),
    ms1280-r17              INTEGER (0..1279),
    ms2560-r17              INTEGER (0..2559),
    ms5120-r17              INTEGER (0..5119),
    ...
  } OPTIONAL
  }
  MUSIM-Starting-SFN-AndSubframe-r17: =    SEQUENCE {
    starting-SFN-r17        INTEGER (0.1103),
    startingSubframe-r17 INTEGER (0..9)
  }
```

TABLE 6 musim-GapLength
Indicates the length of the UE's preferred MUSIM gap length.
musim-GapOffset
Indicates the gap offset of the UE's preferred MUSIM gap.
musim-GapPreferenceList
Indicates the MUSIM gap(s) that the UE prefers to be configured with.
musim-GapRepetitionAndOffsetPeriod
Indicates the gap repetition period and gap offset of the UE's preferred periodic MUSIM gap without leaving RRC_CONNECTED state. This field is only used for periodic gaps.
musim-Starting-SFN-AndSubframe
Indicates gap starting position off or UE's preferred aperiodic MUSIM gap without leaving RRC_CONNECTED state Once the network receives the UE assistance information (UAI) indicating gap preference for MUSIM operation, the network may configure the UE with MUSIM gaps.

An example of RRC specifications that indicates UE behavior while receiving

TABLE 7

1> if the RRCReconfiguration message includes the musim-GapConfig:
2> for each periodic musim-GapID included in the received musim-GapToReleaseList:
3> release the MUSIM periodic gap associated to the musim-GapID from the musim-GapConfigList;

TABLE 7-continued

2> for each periodic musim-GapID included in the received musim-GapToAddModList:
3> if an entry with the matching musim-GapID exists in the musim-GapConfigList:
4> replace the entry with the value received for this musim-GapID;
3> else:
4> add a new entry for this musim-GapID;

An example of RRC specifications including the definition of GapConfiguration is given below in Table-8.

TABLE 8

```
- MUSIM-GapConfig
The IE MUSIM-GapConfig specifies the MUSIM gap configuration and controls
setup/release of MUSIM gaps.
MUSIM-GapConfig information element
-- ASN1START
-- TAG-MUSIM-GAPCONFIG-START
MUSIM-GapConfig-r17: =    SEQUENCE {
    musim-GapToReleaseList-r17        SEQUENCE (SIZE (1.2)) OF MUSIM-
GapID-r17    OPTIONAL,
    musim-GapToAddModList-r17         SEQUENCE (SIZE (1..2)) OF MUSIM-
GapInfo-r17    OPTIONAL,
    musim-AperiodicGap-r17        MUSIM-GapInfo-r17        OPTIONAL, -- Need
N
  ...
}
MUSIM-GapInfo-r17: =    SEQUENCE {
  musim-GapID-r17        MUSIM-GapID-r17    OPTIONAL, -- Cond periodic
  musim-Starting-SFN-AndSubframe-r17        MUSIM-Starting-SFN-AndSubframe-
r17 OPTIONAL, -- Cond aperiodic.
  musim-GapLength-r17        ENUMERATED {ms3, ms4, ms6, ms10, ms20}
OPTIONAL,
musim-GapRepetitionAndOffset-r17    CHOICE {
    ms20-r17          INTEGER (0..19),
    ms40-r17          INTEGER (0.39),
    ms80-r17          INTEGER (0.79),
    ms160-r17            INTEGER (0.159),
    ms320-r17            INTEGER (0.319),
    ms640-r17            INTEGER (0..639),
    ms1280-r17              INTEGER (0.1279),
    ms2560-r17              INTEGER (0..2559),
    ms5120-r17              INTEGER (0.5119),
    ...
} OPTIONAL -- Cond periodic
}
MUSIM-Starting-SFN-AndSubframe-r17 ::=    SEQUENCE {
  starting-SFN-r17    INTEGER (0.1103),
  startingSubframe-r17    INTEGER (0.9)
}
-- TAG-MUSIM-GAPCONFIG-STOP
-- ASN1STOP
```

Further, definitions of various fields as per 3GPP standard specification is given below in Table-9.

TABLE 9 musim-AperiodicGap
Indicate that the UE is allowed to use the MUSIM aperiodic gap if requested in the UEAssistanceInformation.
musim-GapRepetitionAndOffset
Indicates the gap repetition period in ms and gap offset in number of subframes for the periodic MUSIM gap without leaving RRC_CONNECTED state.
musim-Start-SFN-AndSubframe
Indicates gap starting position for the aperiodic MUSIM gap without leaving RRC_CONNECTED state. This field is only used for aperiodic gap.
musim-GapToAddModList
List of MUSIM periodic gap pattern identities to add or modify without leaving RRC_CONNECTED state.
musim-GapToReleaseList
List of MUSIM periodic gap pattern identities to release without leaving RRC_CONNECTED state.
Indicates gap starting position off or UE's preferred aperiodic MUSIM gap without leaving RRC_CONNECTED state MUSIM gap configuration to the UE contains musim-Start-SFN-AndSubframe for aperiodic gaps and musim-GapRepetitionAndOffset for periodic gaps. In another example embodiment, musim gaps may be specified as shown in Table-10.

TABLE 10

```
-- TAG-MUSIM-GAPCONFIG-START
MUSIM-GapConfig-r17: =    SEQUENCE {
        musim-GapToReleaseList-r17                SEQUENCE (SIZE (1.3)) OF MUSIM-
GapId-r17    OPTIONAL, -- Need N
        musim-GapToAddModList-r17                 SEQUENCE (SIZE (1.3)) OF MUSIM-
Gap-r17    OPTIONAL, -- Need N
        musim-AperiodicGap-r17    MUSIM-GapInfo-r17                OPTIONAL, -- Need
N
    ...
}
MUSIM-Gap-r17: =    SEQUENCE {
    musim-GapId-r17        MUSIM-GapId-r17,
    musim-GapInfo-r17        MUSIM-GapInfo-r17
}
-- ASN1START
-- TAG-MUSIM-GAPINFO-START
MUSIM-GapInfo-r17 :: =    SEQUENCE {
    musim-Starting-SFN-AndSubframe-r17    MUSIM-Starting-SFN-AndSubframe-r17
OPTIONAL, -- Cond aperiodic.
    musim-GapLength-r17        ENUMERATED {ms3, ms4, ms6, ms10, ms20}
OPTIONAL, -- Cond gapSetup
    musim-GapRepetitionAndOffset-r17    CHOICE {
        ms20-r17            INTEGER (0..19),
        ms40-r17            INTEGER (0..39),
        ms80-r17            INTEGER (0 . . . 79),
        ms160-r17            INTEGER (0..159),
        ms320-r17            INTEGER (0..319),
        ms640-r17            INTEGER (0..639),
        ms1280-r17            INTEGER (0..1279),
        ms2560-r17            INTEGER (0..2559),
        ms5120-r17            INTEGER (0..5119),
        ...
    }                        OPTIONAL -- Cond periodic
}
MUSIM-Starting-SFN-AndSubframe-r17 :: = SEQUENCE {
    starting-SFN-r17            INTEGER (0.1103),
    startingSubframe-r17            INTEGER (0.9)
}
```

The UE may use the gap configured according to the timing information configured by MUSIM-GapInfo. For example, a periodic gap may be created according to starting-SFN and startingSubFrame, for a duration of musim-GapLength. In certain scenarios, multiple MUSIM gaps may overlap in time among each other.

Multi-radio dual connectivity (DC) is specified by 3GPP in specifications such as TS 37.340. NG-RAN supports multi-radio dual connectivity (MR-DC) operation whereby a UE in RRC_CONNECTED is configured to utilize radio resources provided by two distinct schedulers, located in two different NG-RAN nodes connected via a non-ideal backhaul, one providing new radio (NR) access and the other one providing either evolved UMTS terrestrial radio access (E-UTRA) or NR access. One node may act as a master node (MN) and the other may act as a secondary node (SN). The MN and SN are connected via a network interface and at least the MN is connected to the core network. NG-RAN supports NG-RAN E-UTRA-NR dual connectivity (NGEN-DC), in which a UE is connected to one ng-eNB (an E-UTRA base station that can connect to 5G core) that acts as an MN and one gNB (5G base station) that acts as an SN. NG-RAN also supports NR-E-UTRA Dual Connectivity (NE-DC), in which a UE is connected to one gNB that acts as the MN and one ng-eNB that acts as the SN. The primary cell of a master or secondary cell group is called SpCell. The SpCell of a master cell group is called PCell while the SpCell of a secondary cell group is called PSCell. In MR-DC, a group of serving cells associated with the master node, comprising of the SpCell (PCell) and optionally one or more SCells is called MCG or master cell group.

A group of serving cells associated with the secondary node, comprising of the SpCell (PSCell), and optionally one or more SCells, is known as a secondary cell group (SCG) in MR-DC. The frame timing and SFN between the cells in MCG and SCG may not be aligned.

In wireless communication technologies like NR and long term evolution (LTE), a radio resource control (RRC) connected (RRC_CONNECTED) user equipment (UE) performs various measurements for radio resource management (RRM) purpose, positioning etc. For the RRM, the UE measures reference signals such as synchronization signal block (SSB), channel state information-reference signal (CSI-RS) etc. and reports to the wireless network.

According to the latest version of 3GPP 5G NR (New Radio) stage-2 specification TS 38.300, measurements which are to be performed by the UE for connected mode mobility, are classified in to at least four measurement types:

1. Intra-frequency NR measurements,
2. Inter-frequency NR measurements,
3. Inter-RAT measurements for evolved universal terrestrial radio access (E-UTRA), and
4. Inter-RAT measurements for a universal terrestrial radio access (UTRA).

For each measurement type, one or several measurement objects can be defined (a measurement object defines e.g., a carrier frequency to be monitored). For each measurement object, one or several reporting configurations can be defined (a reporting configuration e.g., defines the reporting criteria). Three reporting criteria are used: event triggered reporting, periodic reporting and event triggered periodic reporting. The association between a measurement object and a reporting configuration is created by a measurement identity (a measurement identity links together one measurement object and one reporting configuration of the same radio access technology)). The measurement identity is used as well when reporting results of the measurements.

For positioning, the UE may report SSB/CSI-RS measurements and may also report measurements based on additional reference signals like positioning reference signal (PRS).

When the UE needs to measure inter frequency NR or inter-RAT measurements or intra-frequency measurements outside the active downlink (DL) band width part (BWP) when the SSB is not completely contained in the active DL BWP, the UE may use measurement gaps. The measurement gaps are configured by the network entity (for e.g., base station or gNB in NR or the like) and there may not be any transmission or reception between the network and the UE during the gap period. The measurement gap configuration includes a gap offset, gap length, repetition period and measurement gap timing advance (mgta). The gap offset specifies the sub-frame (and/or slot) where the measurement gap occurs. The gap length gives the duration of the gap while the repetition period defines how often the measurement gap can occur.

In certain scenarios, the MUSIM gaps may overlap in time with other type of gaps such as measurement gaps. There needs to be a method by which UE decides which gap to use or specifically whether to perform MUSIM operations or measurements, and to perform which measurements or MUSIM operations. Thus, a prioritization is needed for making this decision.

Considering the case of a MUSIM UE with two USIMs (i.e., two UEs in the same MUSIM device), a UE-A (USIM-A) is in an RRC-CONNECTED state with network-A. Dual connectivity (NR-NR DC) is configured at the UE-A. A UE-B (USIM-B) is in an RRC_IDLE or an RRC_INACTIVE or an RRC-CONNECTED state with network-B and requires MUSIM gaps for its operation.

In the prior art, there is no solution on the MN-SN coordination of MUSIM gaps (coordination between the master node and secondary node of network-A, i.e., MN-A and SN-A) and the interaction with a UE-A and MN-A/SN-A when network A is NR-DC. There exists no solution to manage MUSIM gap prioritization and the interaction between MN and SN for gap prioritization.

Thus, it is desired to address the above-mentioned disadvantages or other shortcomings or at least provide a useful alternative for configuring MUSIM gaps, especially gap priority, for multi-SIM UEs in dual connectivity.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect," "another aspect" or similar language means that a particular feature, structure, or characteristic described in connection with the embodiment is included in at least one embodiment of the present disclosure. Thus, appearances of the phrase "in an embodiment," "in one embodiment," "in another embodiment," and similar language throughout this specification may, but do not necessarily, all refer to the same embodiment.

The terms "comprise," "comprising," or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks that carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Reference is now made to the drawings where similar reference characters denote corresponding features consistently throughout the figures.

FIG. 1 illustrates an example of a communication environment 100 associated with a communication network. The communication environment 100 depicts a configuration of a network entity 110 and a user equipment 120, according to one or more embodiments disclosed herein. The configurations as disclosed in FIG. 1 may be understood as parts of the configuration of the network entity 110 and the user equipment 120. Hereinafter, it is understood that terms including "unit" or "module" at the end may refer to the unit for processing at least one function or operation and may be implemented in hardware, software, or a combination of hardware and software.

Referring to FIG. 1, the network entity 110 may include one or more processor(s) 112 (also, referred to as processor 112), a transceiver 114 (e.g., communicator or communication interface), and a storage unit (e.g., memory 116). By way of example, the network entity 110 may associated with one or more gNodeBs (gNBs). The network entity 110 may further be associated with a master node and a secondary node. In an embodiment, the master node and the secondary node may be two different gNBs from two different vendors communicating over a standardized interface. In an embodiment, the master node and the secondary node may be different gNBs from a same vendor. The network entity may be associated with a radio access node in any technology such as 4G LTE or 6G, i.e., gNBs are used as an example to indicate radio access node in wireless technologies. Any other dual connectivity technology may be used in place of new radio dual connectivity. Similarly, MUSIM device may contain more than two USIMs.

The transceiver 114 may perform functions for transmitting and receiving signals. The memory 116 may include executable instructions that, when executed by the processor, cause the system to perform the steps as described above with reference to FIGS. 2-3. As an example, the processor 112 may be a single processing unit or a number of units, all of which could include multiple computing units. The processor 112 may be implemented as one or more microprocessors, microcomputers, microcontrollers, digital signal processors, central processing units, state machines, logic circuitries, and/or any devices that manipulate signals based on operational instructions. Among other capabilities, the processor 112 is configured to fetch and execute computer-readable instructions and data stored in the memory. The processor 112 may include one or a plurality of processors. At this time, one or a plurality of processors 112 may be a general-purpose processor, such as a central processing unit (CPU), an application processor (AP), or the like, and an AI-dedicated processor such as a neural processing unit (NPU). The processor 112 may control the processing of input data in accordance with a predefined operating rule or artificial intelligence (AI) model stored in the non-volatile memory and the volatile memory, i.e., the memory 116. The predefined operating rule or artificial intelligence model is provided through training or learning.

The memory 116 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

In some embodiments, the network entity 110 may be implemented as dedicated hardware units. In some embodiments, the network entity 110 may be implemented in the form of virtualized software units in hardware or cloud environments.

Further, the user equipment 120 may also include one or more processor(s) 122 (also, referred to as processor 112), a transceiver 124 (e.g., communicator or communication interface), and a storage unit (e.g., memory 126). The transceiver 124 may perform functions for transmitting and receiving signals. The functionalities and features of the processor 122, transceiver 124, and memory 126 may be similar to those of the processor 112, transceiver 114, and memory 116, respectively. Therefore, a detailed explanation of the same is omitted herein for the sake of brevity of the present disclosure.

The terms "multi-SIM UE" and "UE" may be used interchangeably in the present disclosure.

As seen in FIG. 1, the user equipment 120 may be a multi-SIM UE having a plurality of SIMs 135*a*, 135*b*, . . . 135*n*. The plurality of SIMs may include a first SIM and a second SIM, or a first USIM and a second USIM from among the SIMs 135*a*-135*n*. In some embodiments, the first USIM associated with a first network of the communication network and the second USIM is associated with a second network of the communication network. The multi-SIM UE 120 may be configured for new radio (NR)-dual connectivity (DC) communication.

FIG. 1 further depicts a system 130 associated with the network entity 110. The system 130 adapted for configuring multi universal subscriber identity module (MUSIM) gaps for multi-subscriber identity module (SIM) user equipment (UE) in the communication network. The system 130 may include the master node 140 and a secondary node 150. In some embodiments, the system 130 may be in communication with the network entity 110. In some embodiments, the system 130 may correspond to the network entity 110 and may be integrated there-with. In some embodiments, the network entity 110 and the system 130 (comprising the master node 140 and the secondary node 150 are associated with the first USIM and the first network associated with the multi-SIM UE. In an alternate embodiment, the network entity 110 and the system 130 (comprising the master node 140 and the secondary node 150 are associated with the second USIM and the second network associated with the multi-SIM UE.

It is appreciated that when reference is made to the term "multi-SIM UE" in the present disclosure, the term "multi-SIM UE" may be intended to refer to one of the first USIM or the second USIM that is in dual connectivity, and accordingly, the master node and the secondary node may refer to the master node and secondary node of the corresponding network (first network in case of first USIM in DC and second network in case of second USIM in DC).

Initially, the multi-SIM UE 120 may be in an RRC connected state (for instance, corresponding to one of the first USIM or the second USIM) and the dual connectivity may be configured for the multi-SIM UE 120.

The system 130, in particular the master node 140, may be configured to send a RRC Reconfiguration with MUSIMGapAssistanceConfig configuration message to the multi-SIM UE 120. The master node 140 may receive a RRC Reconfiguration complete indication from the multi-SIM UE 120. In an embodiment, the master node 140 may send the configuration (otherConfig) to the multi-SIM UE 120 for sending the MUSIM gap request.

The system 130 may be configured to receive a gap configuration request at the master node 140 associated with the network entity 110. The gap configuration request may be received at the master node 140 from the multi-SIM UE 120. The gap configuration request received at the master node 140 may be a UE assistance information (UAI) radio resource control (RRC) message.

Upon receiving the UAI RRC message, the master node 140 may generate a configuration for the multi-SIM UE 120 with one or more MUSIM gaps based on the received gap configuration request. In an embodiment, the master node 140 determines and allocates the MUSIM gaps based on received request and/or the impact of the MUSIM gaps on performance and measurements of both the master node 140 and the secondary node 150.

In an embodiment, the master node 140 may be configured to communicate the MUSIM gaps to the UE 120. The MUSIM gaps communicated to the UE 120 may include gap priority and MUSIM gap configuration (i.e., starting SFN (system frame number), starting subframe, offset, gap repetition period, and gap length). In an embodiment, the master node 140 may indicate details of a reference cell that may be used as a timing reference, i.e., whether the SFN/subframe/offset of the gaps are according to the at least one of a PCell of master node (i.e., SpCell) or PCell of secondary node (i.e., PScell) or any secondary cell of either master node or secondary node. In an embodiment, the MUSIM gaps (SFN/subframe/offset) are according to the PSCell of UE 120 in dual connectivity.

In an embodiment, the master node 140 may send the otherConfig and gap configuration through signaling radio bearer 1 (SRB1) configured by the master node 140. In an embodiment, UE 120 sends the gap configuration request through SRB1 configured by the master node 140.

In an embodiment, the UE 120 may request the MUSIM gaps through an RRC message (e.g., UE assistance information (UAI)) to the secondary node 150 and the secondary node 150 sends the configuration (otherConfig) for sending the gap configuration request.

Further, the master node 140 may send a message indicative of the MUSIM gaps configured for the multi-SIM UE 120 to the secondary node 150. The message may include information related to gap priority of the MUSIM gaps with respect to one or more other gaps. The message sent by the master node 140 to the secondary node 150 may be a CG-ConfigInfo InterNode RRC message. In an embodiment, the configuration of gap priority and the "Keep solution indication" can be transferred from the master node 140 to the secondary node 150 in the CG-ConfigInfo InterNode RRC message. In an embodiment, gap priority may be applied for periodic measurement gaps and may not be provided for aperiodic measurement gap. In an embodiment, aperiodic measurement gap may be always prioritized.

In one embodiment, the gap priority of the MUSIM gaps is indicative of priority of each MUSIM gaps with respect to other MUSIM gaps. That is, each MUSIM gap may have a corresponding priority which may be different from other MUSIM gaps. As an example, MUSIM gap A may have a higher priority than MUSIM gap B.

In another embodiment, each of the MUSIM gaps may be a same gap priority.

Further, the gap priority of the MUSIM gaps is indicative of priority of each MUSIM gaps with respect to one or more other gaps. The one or more other gaps may be measurement gaps. The gap priority of the MUSIM gaps may define whether the MUSIM gaps may be used in overlap scenarios. The overlap scenarios may refer to overlap among the MUSIM gaps, and between one or more of the MUSIM gaps and the one or more other gaps. In case of a full overlap or a partial overlap among the MUSIM gaps, and between one or more of the MUSIM gaps and the one or more other gaps (measurement gaps), the gap priority may indicate whether the MUSIM gaps may be used or the measurement gaps may be used, and which MUSIM gaps may be used based on the corresponding gap priorities. As an example, if there are two gaps configured by the master node 140, i.e., a MUSIM gap with priority M and a measurement gap with priority N, and the gaps fully or partially overlap, the UE 120 uses the gap with higher priority. As an example, if there are three gaps configured by the master node 140, i.e., a MUSIM gap with priority M, another MUSIM gap with priority N, and a measurement gap with priority X, and the gaps fully or partially overlap, the UE 120 uses the gap with higher priority.

In some embodiments, the gap priority of the MUSIM gaps also defines whether the multi-SIM UE 120 may prioritize all the MUSIM gaps.

In an embodiment, the master node 140 informs the secondary node 150 of the MUSIM gaps upon the addition of the MUSIM gaps to the UE 120. In an embodiment, the master node 140 informs the secondary node 150 of the MUSIM gaps upon modification of the MUSIM gaps to the UE 120. In an embodiment, the master node 140 informs the secondary node 150 of the MUSIM gaps upon release of the MUSIM gaps to the UE 120.

Figure 3:
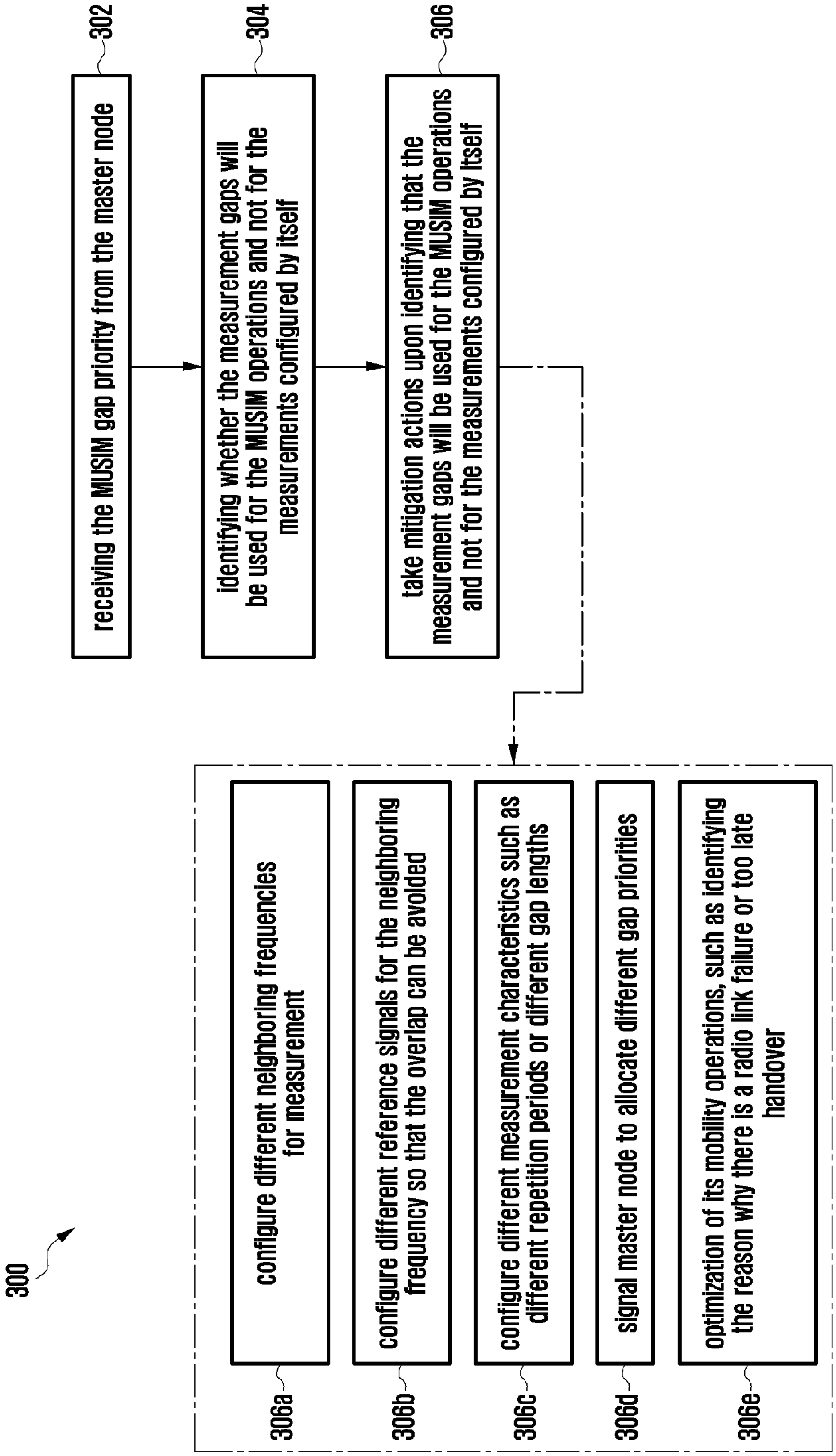
FIG. 3 illustrates a flowchart depicting operation/behavior of the secondary node with the gap priority, according to an embodiment as disclosed herein.
Figure 4:
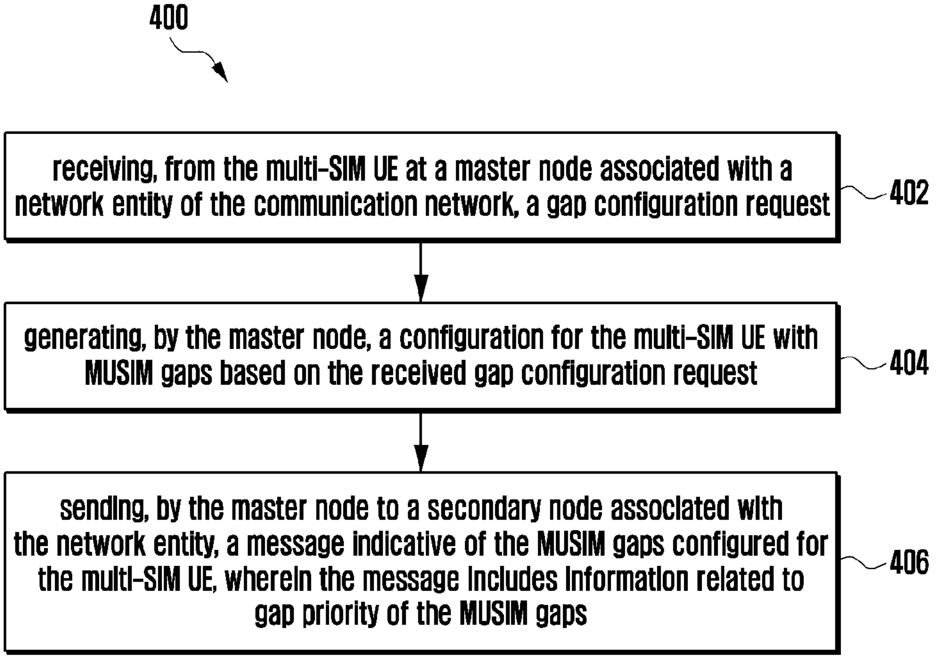
FIG. 4 illustrates a method flow chart depicting a method for configuring MUSIM gaps for multi-SIM UE in a communication network, according to an embodiment as disclosed herein.

Reference is made to FIG. 3 which illustrates a flowchart 300 depicting operation/behavior of the secondary node with the gap priority, in accordance with one or more embodiments of the present disclosure. At step 302, the secondary node 150 receives the MUSIM gap priority from the master node 140. In an embodiment, the secondary node 150 uses the MUSIM gap priority to identify the measurement requirements for any of the measurements configured by itself. At step 304, the secondary node 150 identifies whether the measurement gaps may be used for the MUSIM operations and not for the measurements configured by itself. At step 306, upon identifying that the measurement gaps may be used for the MUSIM operations and not for the measurements configured by itself, the secondary node 150 may take mitigation actions. In non-limiting examples, the mitigation actions may include one or more actions as depicted by steps *306a-306e*.

In one action depicted at step *306a*, if the secondary node 150 identifies that the measurement gaps may be used for MUSIM gaps and not for measurement gaps needed for one of its neighboring frequencies, the secondary node may configure different neighboring frequencies for measurement. In another action depicted at step *306b*, if the secondary node 150 identifies that the measurement gaps may be used for MUSIM gaps and not for measurement gaps needed for one of its neighboring frequencies, the secondary node may configure different reference signals for the neighboring frequency so that the overlap can be avoided. In yet another action depicted at step 306*c*, if the secondary node 150 identifies that the measurement gaps may be used for MUSIM gaps and not for measurement gaps needed for one of its neighboring frequencies, the secondary node may configure different measurement characteristics such as different repetition periods or different gap lengths. In yet another action depicted at step 306*d*, the secondary node 150 may signal master node 140 to allocate different gap priorities. In another action depicted at step 306*e*, the secondary node 150 identifies that the measurement gaps may be used for MUSIM gaps and not for measurement gaps needed for one of its neighboring frequencies, the secondary node uses this information of optimization of its mobility operations, such as identifying the reason why there is a radio link failure or too late handover.

The secondary node 150 also uses other information related to the MUSIM gap for performing scheduling. The secondary node 150 may not send any data in downlink during the MUSIM gap. SN also may not allocate any resources to the UE for its transmission during the MUSIM gap.

In an embodiment, the information sent from the master node 140 to the secondary node 150 for MUSIM gap configuration includes NR RRC IE MUSIM-GapConfig-r17 as given in below Table-11.

TABLE 11

```
MUSIM-GapConfig-r17: =     SEQUENCE {
        musim-GapToReleaseList-r17    SEQUENCE (SIZE (1..3)) OF MUSIM-
GapId-r17    OPTIONAL, -- Need N
        musim-GapToAddModList-r17       SEQUENCE (SIZE (1 .. 3)) OF
MUSIM-Gap-r17    OPTIONAL, -- Need N
        musim-AperiodicGap-r17    MUSIM-GapInfo-r17          OPTIONAL, --
Need N
    ...
  }
  MUSIM-Gap-r17: =    SEQUENCE {
    musim-GapId-r17        MUSIM-GapId-r17,
    musim-GapInfo-r17        MUSIM-GapInfo-r17
  }
  -- ASNISTART
  -- TAG-MUSIM-GAPINFO-START
  MUSIM-GapInfo-r17 ::=    SEQUENCE {
    musim-Starting-SFN-AndSubframe-r17 MUSIM-Starting-SFN-
AndSubframe-r17    OPTIONAL, -- Cond aperiodic
    musim-GapLength-r17    ENUMERATED {ms3, ms4, ms6, ms10, ms20}
OPTIONAL, -- Cond gapSetup
    musim-GapRepetitionAndOffset-r17    CHOICE {
      ms20-r17                    INTEGER (0..19),
      ms40-r17                    INTEGER (0.39),
      ms80-r17                    INTEGER (0..79),
      ms160-r17                     INTEGER (0..159),
      ms320-r17                     INTEGER (0..319),
      ms640-r17                     INTEGER (0..639),
      ms1280-r17                      INTEGER (0..1279),
      ms2560-r17                      INTEGER (0..2559),
      ms5120-r17                      INTEGER (0..5119),
      ...                                 OPTIONAL -- Cond periodic
    }
  musim-GapPriorityToAddModList-r18    SEQUENCE (SIZE (1..3)) OF
GapPriority-r17    OPTIONAL, -- Need N }
  MUSIM-Starting-SFN-AndSubframe-r17: = SEQUENCE {
    starting-SFN-r17                INTEGER (0.1103),
    startingSubframe-r17                    INTEGER (0.9)
  }
  GapPriority-r17 ::=                   INTEGER (1..8)
```

Further, the secondary node 150 may be configured to apply the received message from the master node 140. As mentioned above, the received message is indicative of the MUSIM gaps and the gap priority. The secondary node 150 is configured to create the gaps in uplink/downlink scheduling and for configuring the measurements. The gap priority may be considered by the secondary node 150, in that, the secondary node 150 may reallocate the one or more other gaps (measurement gaps) to a different time period in case the gap priority indicates that the MUSIM gaps may be prioritized (i.e., the MUSIM gaps have a higher priority than the one or more other gaps).

In an embodiment, the secondary node 150 informs master node 140 whether the (configuration of) MUSIM gaps are supported or not supported by the secondary node 150. The master node 140 configures the UE 120 to request for MUSIM gaps and configures MUSIM gaps based on the information that the secondary node 150 supports MUSIM gaps. If the secondary node 150 does not support (configuration of) MUSIM gaps, the master node 140 avoids configuring MUSIM gaps to the UE 120.

In some embodiments, the message sent by the master node 140 to the secondary node 150 may also be indicative of reference cell that could be used as a timing reference, i.e., whether the gaps are according to the at least one of PCell of master node 140 (i.e., SpCell) or PCell of secondary node 150 (i.e., PScell) or any secondary cell of either the master node 140 or the secondary node 150. The secondary node 150 creates MUSIM gaps based on the information from the master node 140. The secondary node 150 creates gaps at the time indicated by the master node 140 (Start SFN+start subframe+offset) with the gap length and gap repetition indicated by the master node 140. In an embodiment, the secondary node 150 uses the reference cell indicated as a timing reference by the master node 140 for creating the gaps. In some embodiments, the CG-ConfigInfo InterNode RRC message may include MUSIM gap configuration with reference cell and gap priority in a new information element (IE) or MeasConfigMN.

In an embodiment, the secondary node 150 creates the MUSIM gaps by using the PCell configured by the master node 140 (SpCell or PCell of a master cell Group (MCG).

In an embodiment, the secondary node 150 does not transmit any downlink physical downlink control channel (PDCCH) or physical downlink shared channel (PDSCH) on the created MUSIM gaps. In an embodiment, the secondary node 150 does not transmit any downlink reference signal on the created MUSIM gaps. In an embodiment, the secondary node 150 does not receive physical random access channel (PRACH), physical uplink control channel (PUCCH), or physical uplink shared channel (PUSCH) on the created MUSIM gaps.

Table 12 depicts an example where CG-ConfigInfo-v1700 is included in CG-ConfigInfo in R17 NR RRC specification, by using a new information element.

TABLE 12

```
CG-ConfigInfo-v1700-IEs: =    SEQUENCE {
   candidateCellListCPC-r17    CandidateCellListCPC-r17        OPTIONAL,
   twoPHRModeMCG-r17    ENUMERATED {enabled}        OPTIONAL,
   lowMobilityEvaluationConnectedInPCell-r17    ENUMERATED    {enabled}
OPTIONAL,
   nonCriticalExtension    CG-ConfigInfo-v18xx-IEs    OP
TIONAL
}
CG-ConfigInfo-v18xx-IEs: =    SEQUENCE {
musim-GapConfig-r17           SetupRelease {MUSIM-GapConfig-r17}
   nonCriticalExtension       SEQUENCE { }    OPTIONAL
}
An example structure is given below:
MeasConfigMN: = SEQUENCE {
   measuredFrequenciesMN    SEQUENCE (SIZE (1.maxMeasFreqsMN)) OF
NR-FreqInfo OPTIONAL,
   measGapConfig    SetupRelease {GapConfig}            OPTIONAL,
   gapPurpose    ENUMERATED {perUE, perFR1}                OPTIONAL,
   ...,
   [[
   measGapConfigFR2    SetupRelease {GapConfig}    OPTIONAL
   ]],
[[
musim-GapConfig-r17    SetupRelease {MUSIM-GapConfig-r17}
]]
}
```

As described above, the master node 140 sends the MUSIM gap configuration in the CG-ConfigInfo InterNode RRC message within MeasConfigMN. An example structure is given below in Table 13.

TABLE 13

```
MeasConfigMN: = SEQUENCE {
   measuredFrequenciesMN    SEQUENCE (SIZE (1.
maxMeasFreqsMN)) OF NR-FreqInfo    OPTIONAL,
   measGapConfig    SetupRelease {GapConfig}      OPTIONAL,
   gapPurpose    ENUMERATED {perUE, perFR1}        OPTIONAL,
   ...,
   [[
   measGapConfigFR2    SetupRelease {GapConfig}    OPTIONAL
   ]],
[[
musim-GapConfig-r17        SetupRelease {MUSIM-GapConfig-r17}
]]
}
```

In an embodiment, the IE MUSIM-GapConfig specifies the MUSIM gap configuration and controls setup/release of MUSIM gaps. An example structure is given below in Table 14.

TABLE 14

```
-- ASN1START
-- TAG-MUSIM-GAPCONFIG-START
MUSIM-GapConfig-r17 ::=      SEQUENCE {
musim-GapToReleaseList-r17    SEQUENCE (SIZE (1..3)) OF MUSIM-
GapId-r17    OPTIONAL, -- Need N
musim-GapToAddModList-r17    SEQUENCE (SIZE (1..3)) OF MUSIM-
Gap-r17    OPTIONAL, -- Need N
```

TABLE 14-continued

```
    musim-AperiodicGap-r17     MUSIM-GapInfo-r17     OPTIONAL, -- Need
N
       ...,
       [[
    musim-GapPriorityToAddModList-r18     SEQUENCE (SIZE (1..3)) OF
GapPriority-r17 OPTIONAL, -- Need N
    musim-GapKeep-r18     ENUMERATED { true}          OPTIONAL --
Need R
       ]]
    }
    CG-ConfigInfo-v18xy-IEs ::=     SEQUENCE {
       musim-GapConfigInfo-r18     MUSIM-GapConfig-r17       OPTIONAL,
       musim-CapRestrictionInfo-r18 ::=     SEQUENCE {
          musim-CapRestriction-r18     MUSIM-CapRestriction-r18     OPTIONAL,
          musim-CandidateBandList-r18     MUSIM-CandidateBandList-r18
OPTIONAL
  }                              OPTIONAL,
       nonCriticalExtension     SEQUENCE { }              OPTIONAL
    }
```

In an embodiment, the master node 140 releases the configured MUSIM gaps upon configuring the one or more other gaps, such as measurement gaps. In an embodiment, the master node 140 may configure the gaps to the UE 120 and the master node 140

In an embodiment, the master node 140 may configure measurement gaps to the UE 120 and the master node 140 releases the configured measurement gaps upon configuring the MUSIM gaps. In an embodiment, the master node 140 may configure measurement gaps to the UE 120 and the master node 140 releases the secondary cell group (SCG) upon configuring the MUSIM gaps. In an embodiment, the master node 140 may configure measurement gaps to the UE 120 and the master node 140 deactivates the SCG upon configuring the MUSIM gaps. In an embodiment, the master node 140 releases the dual connectivity upon configuring the measurement gaps.

In an embodiment, the master node 140 configures only one of the MUSIM gaps or measurement gaps to the UE-A which is configured with dual connectivity.

In an embodiment, the one or more other gaps may include measurement gaps, FR2 gaps, and positioning measurement gaps. In an embodiment, the master node 140 configures only any two among MUSIM gaps, measurement gaps, FR2 gaps, and positioning measurement gaps or dual connectivity to the UE 120 and releases already configured one of them while configuring the third one.

As described above, the multi-SIM UE 120 may include the first USIM and the second USIM. Considering the first USIM being configured for dual connectivity, with respect to PSCell addition, the first USIM may be configured with MUSIM gaps by the first network. The first USIM may avoid performing second USIM operations such as at least one of paging reception, system information block (SIB) reception, cell search, cell reselection measurements, during the configured measurement gaps while performing PSCell addition and uses the shared hardware, RF and software resources for the operation in the first USIM.

In an embodiment, upon receiving the RRC reconfiguration message for PSCell addition or upon the execution of conditional PSCell Addition, the first USIM avoids performing second USIM operations such as at least one of the paging reception, SIB reception, cell search, cell reselection measurements, during the configured measurement gaps and uses the shared hardware, RF and software resources for the operation in the UE-A, till random access in the SN PSCell is completed during PSCell addition.

In an embodiment, with respect to the first USIM behavior for PSCell Change, the first USIM avoids performing the UE-B operations such as at least one of paging reception, SIB reception, cell search, cell reselection measurements, during the configured measurement gaps while performing PSCell change and uses the shared hardware, RF and software resources for the operation in the first USIM.

In an embodiment, upon receiving the RRC reconfiguration message for PSCell change or upon the execution of conditional PSCell change, the first USIM avoids performing second USIM operations such as at least one of paging reception, SIB reception, cell search, cell reselection measurements, during the configured measurement gaps n and uses the shared hardware, RF and software resources for the operation in the first USIM, till random access in the target SN PSCell is completed during PSCell change.

Figure 2:
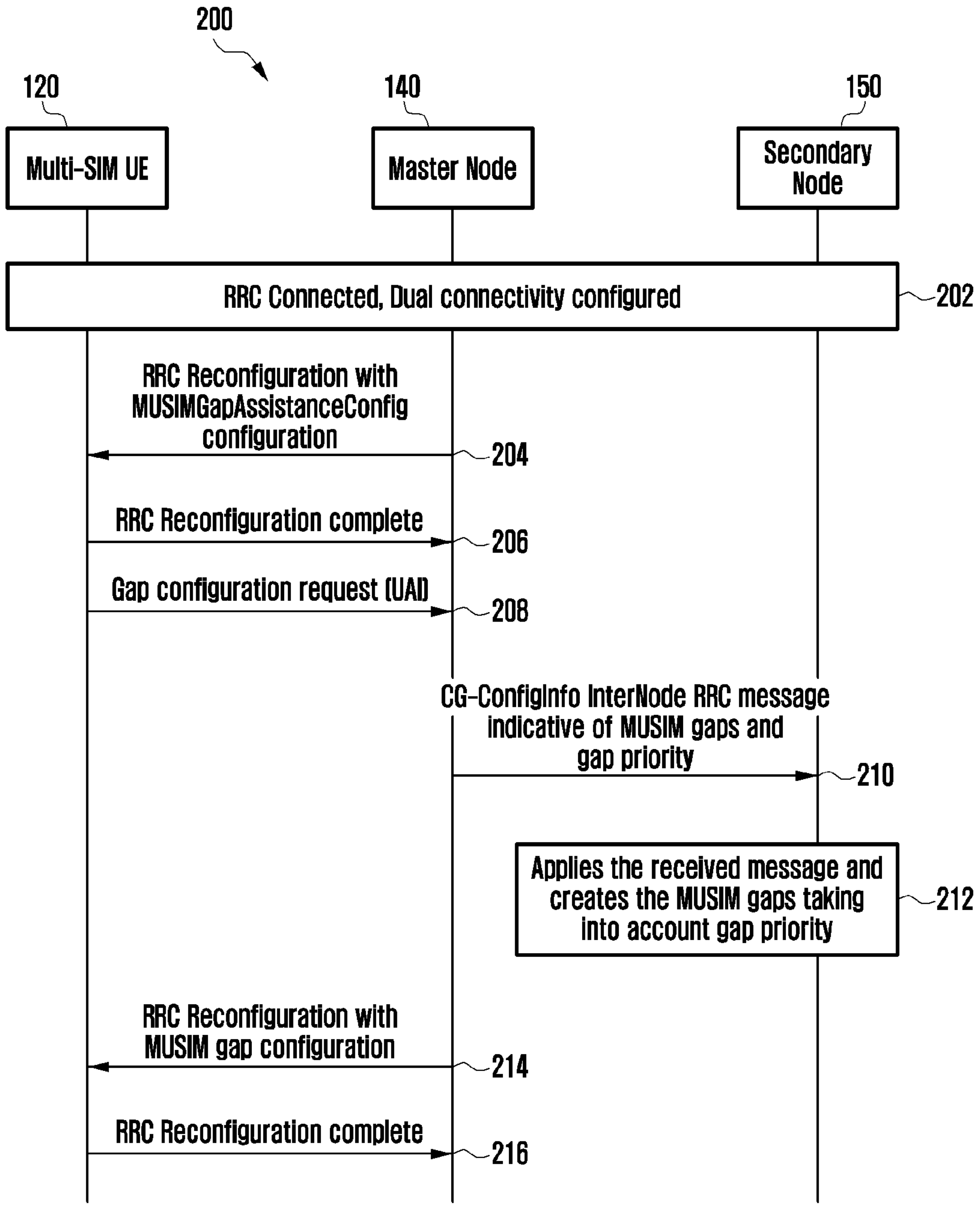
FIG. 2 illustrates a sequence diagram depicting communication among the multi-SIM UE (for instance, a first USIM which is configured for dual connectivity), the master node (related to the first network associated with the first USIM), and a secondary node for configuring MUSIM gaps for multi-SIM UE in a communication network, according to an embodiment as disclosed herein.

Reference is made to FIG. 2 which illustrates a sequence diagram depicting communication among the multi-SIM UE (for instance, first USIM which is configured for dual connectivity), the master node (related to the first network associated with the first USIM), and a secondary node for configuring MUSIM gaps for multi-SIM UE in a communication network.

At step 202, the multi-SIM UE 120 may be in an RRC connected state and the dual connectivity may be configured for the multi-SIM UE 120.

At step 204, the master node 140 may send an RRC reconfiguration with MUSIMGapAssistanceConfig configuration message to the multi-SIM UE 120.

At step 206, the master node 140 may receive a RRC reconfiguration complete indication from the multi-SIM UE 120.

At step 208, a gap configuration request such as a UE assistance information (UAI) radio resource Control (RRC) message is sent by the multi-SIM UE 120 to the master node 140. Upon receiving the UAI RRC message, the master node 140 may configure the multi-SIM UE 120 with one or more MUSIM gaps based on the received gap configuration request.

At step 210, the master node 140 may send a message indicative of the MUSIM gaps configured for the multi-SIM UE 120 to the secondary node 150. The message may include information related to gap priority of the MUSIM gaps with respect to one or more other gaps. The message sent by the master node 140 to the secondary node 150 may be a CG-ConfigInfo InterNode RRC message.

At step 212, the secondary node 150 applies the received message from the master node 140 which is indicative of the MUSIM gaps and the gap priority. The secondary node 150 is configured to create the gaps in uplink/downlink scheduling and for configuring the measurements. The gap priority may be considered by the secondary node 150 in its operation.

At step 214, the master node 140 may send an RRC reconfiguration with MUSIM gap configuration message to the multi-SIM UE 120.

At step 216, the multi-SIM UE 120 may send a RRC reconfiguration complete indication to the master node 140.

A detailed description related to the various steps of FIG. 2 is already covered in the description related to FIG. 1 and is omitted herein for the sake of brevity.

FIG. 3 illustrates a method flow chart depicting a method 400 for configuring MUSIM gaps for multi-SIM UE in a communication network, in accordance with an example embodiment of the present disclosure. The multi-SIM UE is configured for new radio (NR)-dual connectivity (DC) communication. The multi-SIM UE includes a first USIM associated with a first network of the communication network and a second USIM associated with a second network of the communication network. The network entity, the master node, and the secondary node are associated with the first USIM of the multi-SIM UE and the first network.

At step 402, the method 400 comprises receiving, at the master node 140 associated with the network entity from the multi-SIM U 120E, a gap configuration request.

At step 404, the method 400 comprises generating, by the master node 140, a configuration for the multi-SIM UE with MUSIM gaps based on the received gap configuration request. The gap configuration request is a UE assistance information (UAI) radio resource control (RRC) message.

At step 406, the method 400 comprises sending, by the master node 140 to the secondary node 150 associated with the network entity, a message indicative of the MUSIM gaps configured for the multi-SIM UE, wherein the message includes information related to gap priority of the MUSIM gaps. The message sent by the master node to the secondary node is a CG-ConfigInfo InterNode RRC message The gap priority of the MUSIM gaps is indicative of priority of the MUSIM gaps with respect to one or more other gaps in case of an overlap among the MUSIM gaps and the one or more other gaps. The one or more other gaps include measurement gaps.

The gap priority of the MUSIM gaps is indicative of whether the multi-SIM UE may prioritize all the MUSIM gaps.

The method 400 may further comprise applying, by the secondary node, the received message indicative of the MUSIM gaps and the gap priority to create one or more of the MUSIM gaps and one or more other gaps in uplink/downlink scheduling and for configuring the measurements.

While the above discussed steps in FIG. 3 are shown and described in a particular sequence, the steps may occur in variations to the sequence in accordance with various embodiments. Further, a detailed description related to the various steps of FIG. 3 is already covered in the description related to FIGS. 1-2 and is omitted herein for the sake of brevity.

The present disclosure describes communication of gap priority of MUSIM gaps and other gaps along with other gap related parameters. This allows the secondary node to identify whether the measurements configured by itself may be performed and if not performed, the secondary node may ensure that the mobility performance is not affected. The secondary node may also use the information for self-optimization purposes. If there is a radio link failure due to too late handover (handover where the mobility is triggered after the source cell becomes weak), one of the reasons could be inadequate time for performing measurements as the gaps are used for MUSIM operations. Gap priority and other information helps to identify and mitigate this problem. Moreover, other information also helps SN to decide whether to schedule the UE or not.

The various actions, acts, blocks, steps, or the like in the sequence flow diagrams may be performed in the order presented, in a different order, or simultaneously. Further, in some embodiments, some of the actions, acts, blocks, steps, or the like may be omitted, added, modified, skipped, or the like without departing from the scope of the disclosure.

Unless otherwise defined, all technical and scientific terms used herein have the same meaning as commonly understood by one ordinary skilled in the art to which this disclosure belongs. The system, methods, and examples provided herein are illustrative only and not intended to be limiting.

While specific language has been used to describe the present subject matter, any limitations arising on account thereto, are not intended. As would be apparent to a person in the art, various working modifications may be made to the method to implement the inventive concept as taught herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The embodiments disclosed herein can be implemented through at least one software program running on at least one hardware device and performing network management functions to control the elements. The elements can be at least one of a hardware device, or a combination of hardware device and software module.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements.

Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a communication system, the method comprising:
- transmitting, to a first base station operating as a master node in a dual connectivity, a UE assistance information message for a first gap, the first gap being a multi-universal subscriber identity module (MUSIM) gap;
- receiving, from the first base station, a radio resource control (RRC) message including a MUSIM gap configuration, wherein the MUSIM gap configuration includes gap priority information associated with the first gap; and
- in case that a collision occurs between the first gap and a second gap, identifying a higher priority gap among the first gap and the second gap based on the gap priority information,
- wherein the MUSIM gap configuration is associated with cell group configuration information for a second base station operating as a secondary node in the dual connectivity.

2. The method of claim 1, wherein the collision occurs as a full overlap or a partial overlap between the first gap and the second gap in a time domain.

3. The method of claim 2, wherein the second gap is at least one of a measurement gap or another MUSIM gap other than the first gap.

4. The method of claim 1, wherein the MUSIM gap configuration further includes at least one of a starting system frame number (SFN), a starting subframe, an offset, a gap repetition period, and a gap length.

5. A method performed by a first base station operating as a master node in a dual connectivity in a communication system, the method comprising:
- receiving, from a user equipment (UE), a UE assistance information message for a first gap, the first gap being a multi-universal subscriber identity module (MUSIM) gap;
- transmitting, to a second base station operating as a secondary node in the dual connectivity, cell group configuration information associated with a MUSIM gap configuration, wherein the MUSIM gap configuration includes gap priority information associated with the first gap; and
- transmitting, to the UE, a radio resource control (RRC) message including the MUSIM gap configuration,
- wherein in case that a collision occurs between the first gap and a second gap, a higher priority gap among the first gap and the second gap is identified based on the gap priority information.

6. The method of claim 5, wherein the collision occurs as a full overlap or a partial overlap between the first gap and the second gap in a time domain.

7. The method of claim 6, wherein the second gap is at least one of a measurement gap or another MUSIM gap other than the first gap.

8. The method of claim 5, wherein the MUSIM gap configuration further includes at least one of a starting system frame number (SFN), a starting subframe, an offset, a gap repetition period, and a gap length.

9. A user equipment (UE) in a communication system, the UE comprising:
- a transceiver, and
- a controller coupled with the transceiver configured to:
  - transmit, to a first base station operating as a master node in a dual connectivity, a UE assistance information message for a first gap, the first gap being a multi-universal subscriber identity module (MUSIM) gap,
  - receive, from the first base station, a radio resource control (RRC) message including a MUSIM gap configuration, wherein the MUSIM gap configuration includes gap priority information associated with the first gap, and
  - in case that a collision occurs between the first gap and a second gap, identify a higher priority gap among the first gap and the second gap based on the gap priority information,
- wherein the MUSIM gap configuration is associated with cell group configuration information for a second base station operating as a secondary node in the dual connectivity.

10. The UE of claim 9, wherein the collision occurs as a full overlap or a partial overlap between the first gap and the second gap in a time domain.

11. The UE of claim 9, wherein the second gap is at least one of a measurement gap or another MUSIM gap other than the first gap.

12. The UE of claim 9, wherein the MUSIM gap configuration further includes at least one of a starting system frame number (SFN), a starting subframe, an offset, a gap repetition period, and a gap length.

13. A first base station operating as a master node in a dual connectivity in a communication system, the first base station comprising:
- a transceiver, and
- a controller coupled with the transceiver configured to:
  - receive, from a user equipment (UE), a UE assistance information message for a first gap, the first gap being a multi-universal subscriber identity module (MUSIM) gap; and
  - transmit, to a second base station operating as a secondary node in the dual connectivity, cell group configuration information associated with a MUSIM gap configuration, wherein the MUSIM gap configuration includes gap priority information associated with the first gap, and transmit, to the UE, a radio resource control (RRC) message including the MUSIM gap configuration, wherein in case that a collision occurs between the first gap and a second gap, a higher priority gap among the first gap and the second gap is identified based on the gap priority information.

14. The first base station of claim 13, wherein the collision occurs as a full overlap or a partial overlap between the first gap and the second gap in a time domain.

15. The first base station of claim 13, wherein the second gap is at least one of a measurement gap, or another MUSIM gap other than the first gap.

16. The first base station of claim 13, wherein the MUSIM gap configuration further includes at least one of a starting system frame number (SFN), a starting subframe, an offset, a gap repetition period, and a gap length.

* * * * *